United States Patent
Lin

(10) Patent No.: US 7,272,112 B2
(45) Date of Patent: Sep. 18, 2007

(54) QOS ROUTER SYSTEM FOR EFFECTIVELY PROCESSING FRAGMENTED IP PACKETS AND METHOD THEREOF

(75) Inventor: Jyun-Naih Lin, Taipei (TW)

(73) Assignee: Institute for Information Industry, Taipei (TW)

( * ) Notice: Subject to any disclaimer, the term of this patent is extended or adjusted under 35 U.S.C. 154(b) by 1103 days.

(21) Appl. No.: 10/390,762

(22) Filed: Mar. 19, 2003

(65) Prior Publication Data
US 2004/0090965 A1    May 13, 2004

(51) Int. Cl.
*H04L 12/26* (2006.01)
(52) U.S. Cl. .................................... 370/230; 370/230.1
(58) Field of Classification Search ................ 370/230, 370/230.1
See application file for complete search history.

(56) References Cited

U.S. PATENT DOCUMENTS

| | | | |
|---|---|---|---|
| 6,253,321 B1 * | 6/2001 | Nikander et al. ........... 713/160 |
| 6,781,994 B1 * | 8/2004 | Nogami et al. .......... 370/395.1 |
| 6,798,777 B1 * | 9/2004 | Ferguson et al. ........... 370/392 |
| 7,215,637 B1 * | 5/2007 | Ferguson et al. ........ 370/230.1 |
| 2002/0126672 A1 * | 9/2002 | Chow et al. ................. 370/392 |
| 2006/0045074 A1 * | 3/2006 | Lee ............................. 370/352 |
| 2006/0067213 A1 * | 3/2006 | Evans et al. ................ 370/229 |

* cited by examiner

*Primary Examiner*—Steven Nguyen
*Assistant Examiner*—Phuongchau Ba Nguyen
(74) *Attorney, Agent, or Firm*—Bacon & Thomas, PLLC

(57) ABSTRACT

QoS router system and method are provided for effectively processing fragmented IP packets transmitted over a network. When receiving a first fragmented IP packet of a set from a flow, a router determines whether to allow the first packet to pass or to drop by according to predefined QoS rules. A pass status is recorded in a record if the packet is allowed to pass. A drop status is recorded in the record if the packet is dropped. When receiving other fragmented IP packet of the same set, the router determines whether to allow the fragmented packet to pass or to drop by according to the previous record. If the record is drop status, the packet is dropped, and if the record is pass status, the packet is allowed to pass when the used bandwidth of the flow does not exceeds a predetermined bandwidth.

14 Claims, 8 Drawing Sheets

| source IP addr | ID | cur. time | status |
|---|---|---|---|
| 1230 | 2000 | 15:03 | pass |
| ⋮ | ⋮ | ⋮ | ⋮ |

FIG. 4A

| source IP addr | ID | cur. time | status |
|---|---|---|---|
| 1230 | 2000 | 15:02 | drop |
| ⋮ | ⋮ | ⋮ | ⋮ |

FIG. 4B

QOS ROUTER SYSTEM FOR EFFECTIVELY PROCESSING FRAGMENTED IP PACKETS AND METHOD THEREOF

BACKGROUND OF THE INVENTION

1. Field of the Invention

The present invention relates to quality of service (QoS) routers technology and, more particularly, to a QoS router system for effectively processing fragmented Internet Protocol (IP) packets and method thereof.

2. Description of Related Art

Conventionally, an IP fragmentation must be performed on a packet having a length larger than a maximum transmission unit (MTU) before the packet is sent to a specific interface via the IP layer. For example, as shown in FIG. 1A, a large packet is fragmented into three IP packets after the IP fragmentation is performed. Furthermore, as shown in FIG. 1B, each of the IP packets has the same identification (ID) and source IP address. This means that all three IP packets are formed from the same packet by means of IP fragmentation. Value '1' in a more fragments (MF) bit of the 'flag' field means that there are subsequent IP packets originated from the same packet that has been fragmented by means of the same IP fragmentation. On the contrary, value '0' in the MF bit of the 'flag' field means that there is no subsequent IP packet originated from the same packet which has been fragmented by means of the same IP fragmentation. Value in a field of fragment offset represents an offset of an IP packet within a packet that has not been fragmented by means of IP fragmentation. As shown, a first IP packet has a value of 0 in the field of fragment offset. Hence, a machine at a destination is able to reassemble the received IP packets.

A QoS router typically takes each packet as an independent one in deciding a passing or dropping of the packet without considering whether an IP fragmentation has been performed on the packet. Hence, the router may continuously allow subsequent fragmented IP packets to pass for being sent to a destination machine even a previous fragmented IP packet has been dropped when a plurality of fragmented IP packets originated from the same packet pass through the router. Unfortunately, in this case a complete original packet cannot be obtained at the destination machine by reassembling the passed fragmented IP packets because there is at least one fragmented IP packet dropped. This has the drawbacks of wasting channel bandwidth available on network and wasting both time and memory of the following routers and the destination machine for processing them. Therefore, it is desirable to provide a novel QoS router system and method for effectively processing fragmented IP packets for a potential reassembly of the same in order to mitigate and/or obviate the aforementioned problems.

SUMMARY OF THE INVENTION

The object of the present invention is to provide quality of service (QoS) router system and method for effectively processing fragmented Internet Protocol (IP) packets by determining whether a fragmented IP packet should be passed or dropped, so that the reassembly of the fragmented IP packets is not required if one of the fragmented IP packets is dropped, thereby saving the channel bandwidth, and the processing time and memory of the following routers and destination machine, and increasing a probability of successfully reassembling the fragmented IP packets at the destination machine.

In one aspect of the present invention, there is provided a quality of service (QoS) method for effectively processing a plurality of fragmented Internet Protocol (IP) packets transmitted over flows of a network. The method comprises the steps of: (A) when receiving a first fragmented IP packet of the same set of fragmented IP packets from a flow, a router determining whether to allow the first fragmented IP packet to pass or to drop by according to predefined QoS rules, wherein when determining to allow the packet to pass, a 'pass' status is recorded in a record corresponding to the set of fragmented IP packets, and when determining to drop the packet, a 'drop' status is recorded in a record corresponding to the set of fragmented IP packets; and (B) when receiving other fragmented IP packet of the same set of fragmented IP packets, the router determining whether to allow the fragmented IP packet to pass or to drop by according to the previous record of the set of fragmented IP packets, wherein if the record of the set of fragmented IP packets is 'drop' status, the packet is dropped, and if the record of the set of fragmented IP packets is 'pass' status, the packet is allowed to pass when the used bandwidth of the flow does not exceeds a predetermined maximum bandwidth for it, otherwise the packet is dropped and the record of the set of fragmented IP packets is modified to the 'drop' status.

In another aspect of the present invention, there is provided a quality of service (QoS) system for effectively processing a plurality of fragmented Internet Protocol (IP) packets. A first and a second machine are resided in a network. The first machine is capable of forming a set of multiple fragmented IP packets by performing an IP fragmentation on a packet to be transmitted to the second machine. At least one router is provided for routing the packet of the set of fragmented IP packets transmitted from a flow to the second machine. When receiving a first fragmented IP packet of a set of fragmented IP packets, the router determines whether to allow the first fragmented IP packet to pass or to drop by according to predefined QoS rules. When determining to allow the packet to pass, a 'pass' status is recorded in a record corresponding to the set of fragmented IP packets. When determining to drop the packet, a 'drop' status is recorded in a record corresponding to the set of fragmented IP packets. When receiving other fragmented IP packet of the same set of fragmented IP packets, the router determines whether to allow the fragmented IP packet to pass or to drop by according to the previous record of the set of fragmented IP packets. If the record of the set of fragmented IP packets is 'drop' status, the packet is dropped, and if the record of the set of fragmented IP packets is 'pass' status, the packet is allowed to pass when the used bandwidth of the flow does not exceeds a predetermined maximum bandwidth for it. Otherwise, the packet is dropped and the record of the set of fragmented IP packets is modified to the 'drop' status.

Other objects, advantages, and novel features of the invention will become more apparent from the detailed description when taken in conjunction with the accompanying drawings.

BRIEF DESCRIPTION OF THE DRAWINGS

FIGS. 4A and 4B are tables showing records of passed and dropped fragmented IP packets respectively.

DETAILED DESCRIPTION OF THE PREFERRED EMBODIMENT

Figure 1A:
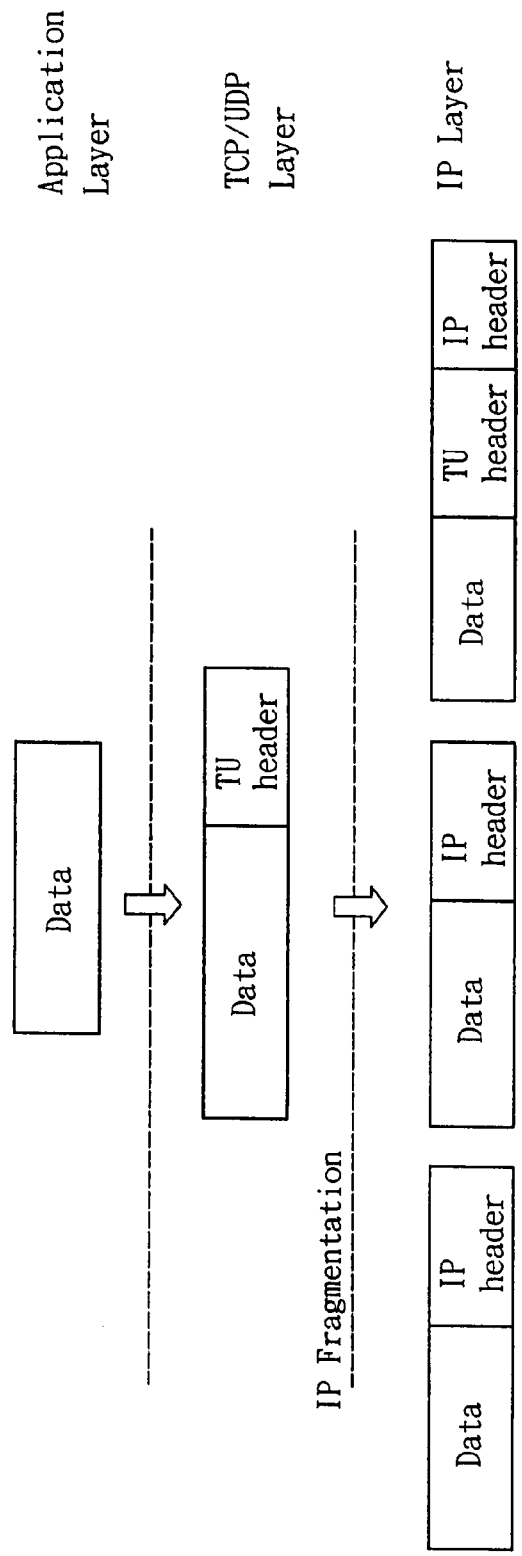
FIG. 1A is a schematic view illustrating a fragmentation of a packet into three fragmented IP packets.
Figure 1B:
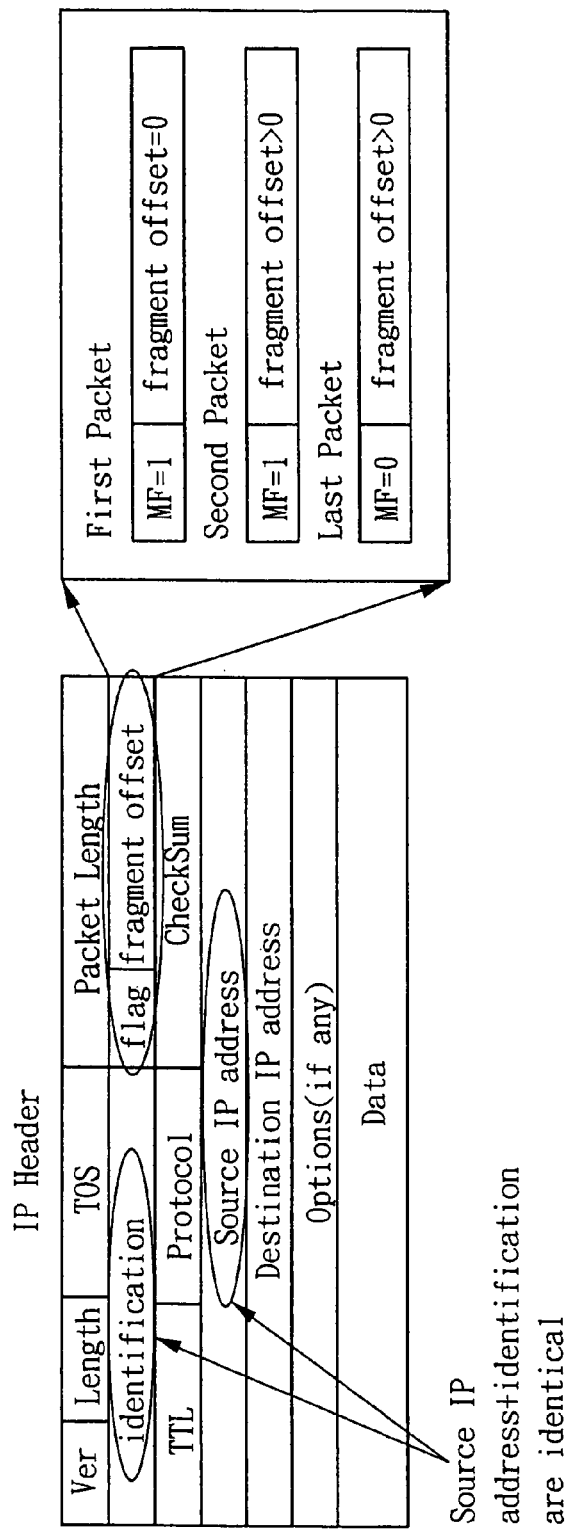
FIG. 1B is a schematic view illustrating various fields of a fragmented IP packet shown in FIG. 1A.
Figure 2:
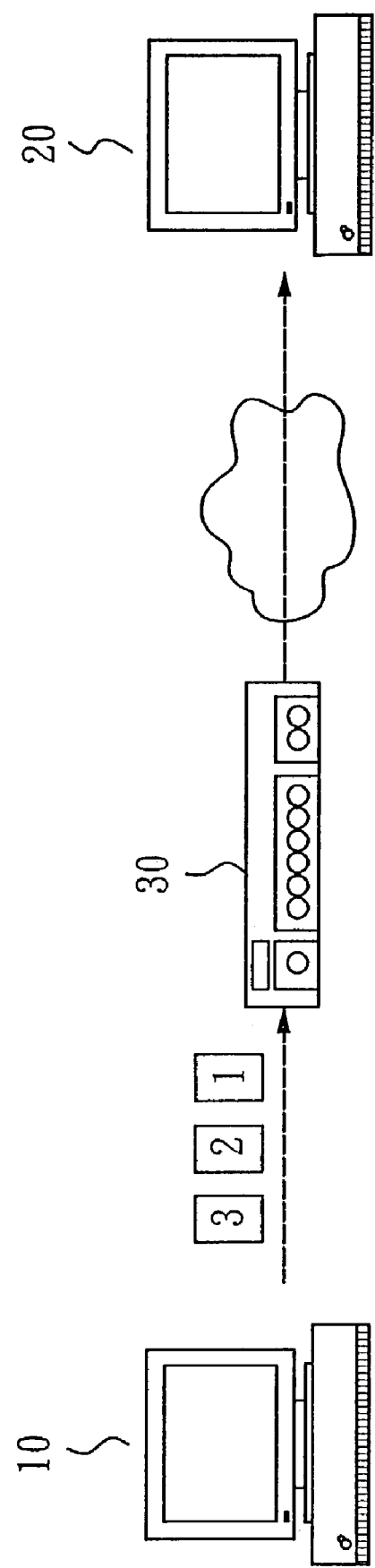
FIG. 2 schematically shows a transmission of fragmented IP packets from a first machine to a second machine via a QoS router according to the present invention.

With reference to FIG. 2, there is shown a QoS router system for effectively processing fragmented IP packets in accordance with the present invention. The system comprises a first machine 10, a second machine 20, and a QoS router 30 resided a network. The first machine 10 can perform an IP fragmentation on a packet to be transmitted to the second machine via the network for forming a set of multiple IP fragmented packets, and then transmit the fragmented packets. The router 30 receives those fragmented packets transmitted from a flow and routes them to the second machine 20.

Figure 3:
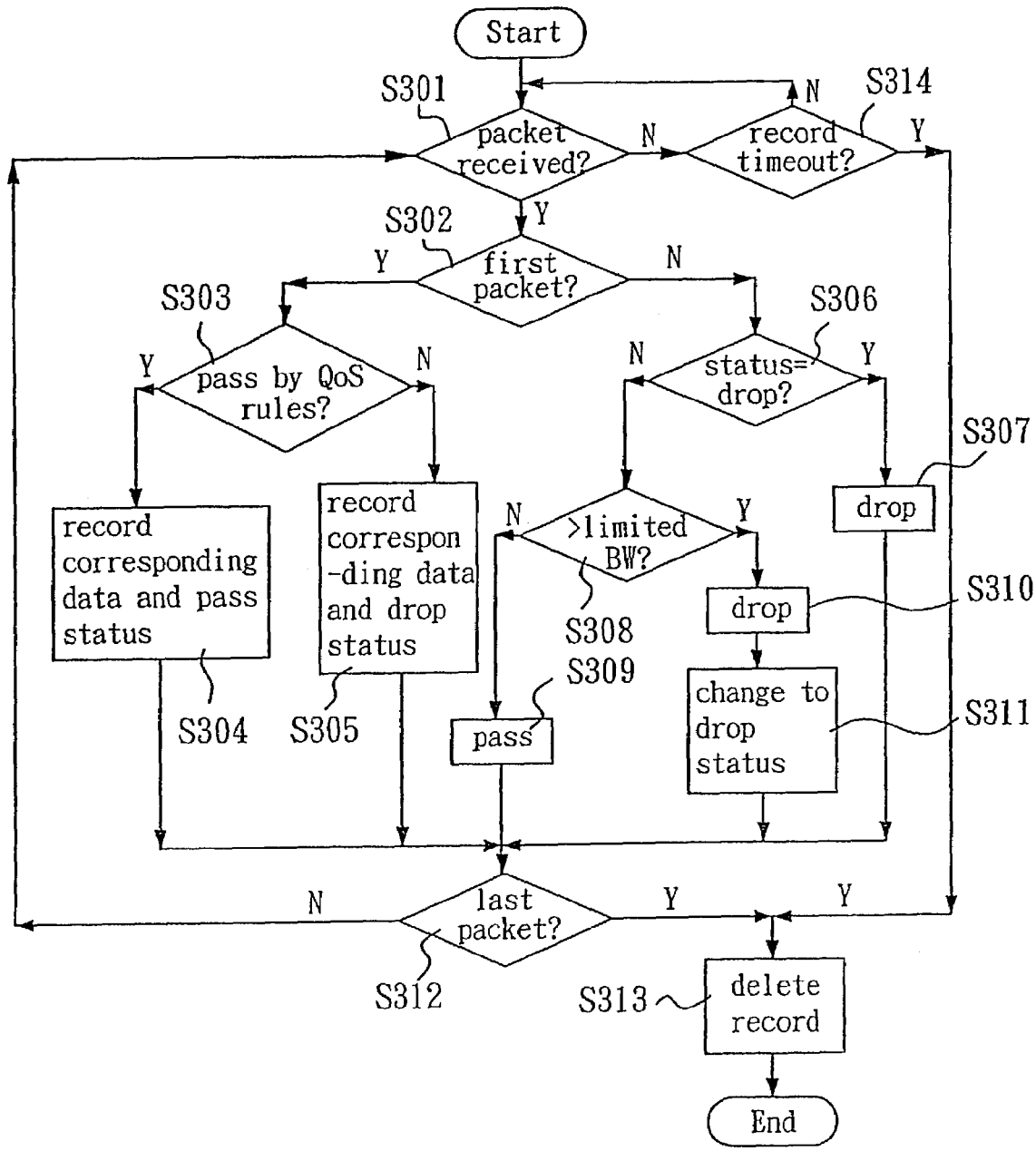
FIG. 3 is a flowchart illustrating a process of effective processing fragmented IP packets according to the present invention.

With reference to FIG. 3, there is shown a flowchart illustrating a process of effectively processing fragmented IP packets in accordance with the present invention. Steps of the process will now be described in detail below. In step S301, the router 30 determines whether a fragmented IP packet is received from a flow. If yes, the process goes to step S302. Otherwise, the process jumps to step S314. In step S302, it is determined whether the received fragmented IP packet is the first one of a set of fragmented IP packets (i.e., the first fragmented IP packet of a set). If yes, the process goes to step S303. Otherwise, the process jumps to step S306. Note that if the field of fragment offset has a value of '0' and the MF bit of flag field has a value of '1', it means that the received fragmented IP packet is the first fragmented IP packet of a set. On the contrary, if the value is not 0 in the field of fragment offset, it means that the fragmented IP packet is not the first fragmented IP packet of a set.

In step S303, it is determined whether the received first fragmented IP packet is allowed to pass or not, by examining whether the received fragmented IP packet satisfies the QoS rules predefined in the router 30. The predefined QoS rules are: the first fragmented IP packet of a set is dropped if the used bandwidth of the flow exceeds a limited bandwidth; the first fragmented IP packet is passed if the used bandwidth of the flow does not exceed a guaranteed bandwidth; and the passing or dropping of the first fragmented IP packet is decided by a Random Early Detection (RED) technique if the used bandwidth of the flow is between the limited bandwidth and the guaranteed bandwidth.

If in step S303 the router determines that the first fragmented IP packet can pass, the process goes to step S304, otherwise, it goes to step S305. In step S304, in a case that the first fragmented IP packet is allowed to pass in the step S303, the router 30 records corresponding data of the first fragmented IP packet including the identification, source IP address, current time, and 'pass' status in a record of a table as shown in FIG. 4A. In step S305, in another case that the first fragmented IP packet is dropped as decided in the step S303, the router 30 records corresponding data including the identification, source IP address, current time, and 'drop' status in a record of the table as shown in FIG. 4B.

If step S302 determines that the fragmented IP packet is not the first one of a set, step S306 is executed to determine whether the received packet should be dropped. Such a determination is done by taking the identification and source IP address of the received packet as an index to check the corresponding status field in the table. If the status field is recorded with 'drop', it indicates that at least one packet in the set of fragmented IP packets has been dropped, and thus the second machine 20 is not able to reassemble the original packet. Therefore, step S307 is executed to drop the received packet, so as not to waste the network bandwidth.

If step S306 determines that the status field is not recorded with 'drop', step S308 is executed to determine whether the used bandwidth of the flow exceeds a predetermined bandwidth, so as to determine whether to allow the received packet to pass or to drop the received packet. In this embodiment, when the used bandwidth of the flow does not exceed the limited bandwidth of the flow, the received packet is allowed to pass (step S309).

If step 308 determines that the used bandwidth of the flow is larger than the limited bandwidth, the received packet is dropped (step 310), and the corresponding status field of the table in the router 30 is modified to 'drop' (step S311).

Step S312 determines whether a last fragmented IP packet of a set has been received by examining the fragment offset field and the MF bit of 'flag' field in the IP header of the packet. If the fragment offset is not '0' and the MF bit is '0', it means that the fragmented IP packet is the last one of the set of fragmented IP packets (i.e., no subsequent fragmented IP packet of the same set). If step S312 determines that the received packet is the last one, the router 30 deletes the record of the set of fragmented IP packets (step S313). If step S312 determines that the received packet is not the last one, the process goes to step S301 to wait for receiving packets.

In step S314, it is determined whether there is no fragmented IP packet of a set received after a predetermined period of time (timeout) has passed. If yes, it indicates that maybe there is an error during the packet transmission, and the process jumps to step S313 to delete the record of the set of fragmented IP packets.

Figure 5:
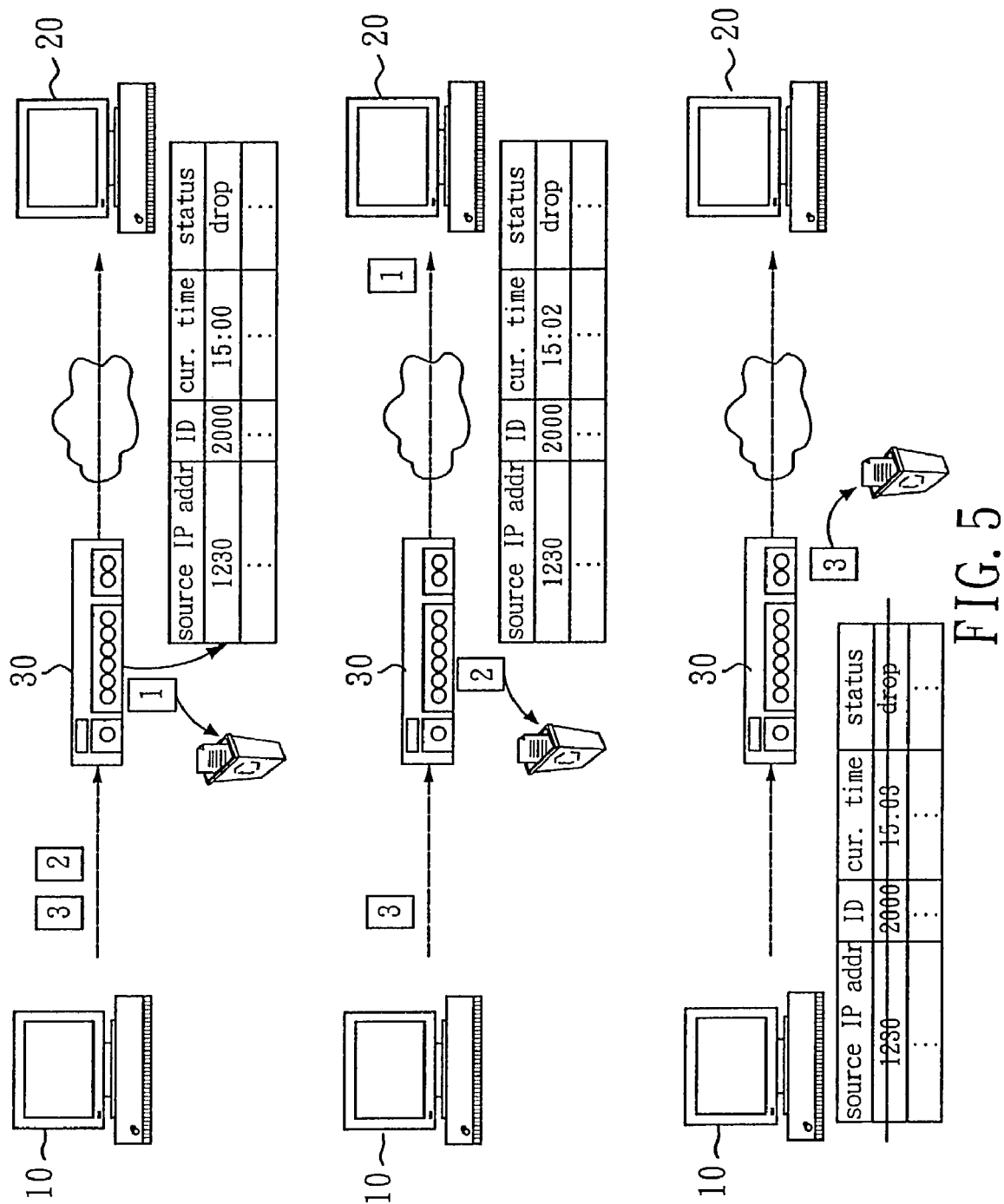
FIGS. 5, 6, and 7 present schematically a transmission of fragmented IP packets from the first machine to the second machine via the router under three different conditions respectively.
Figure 6:
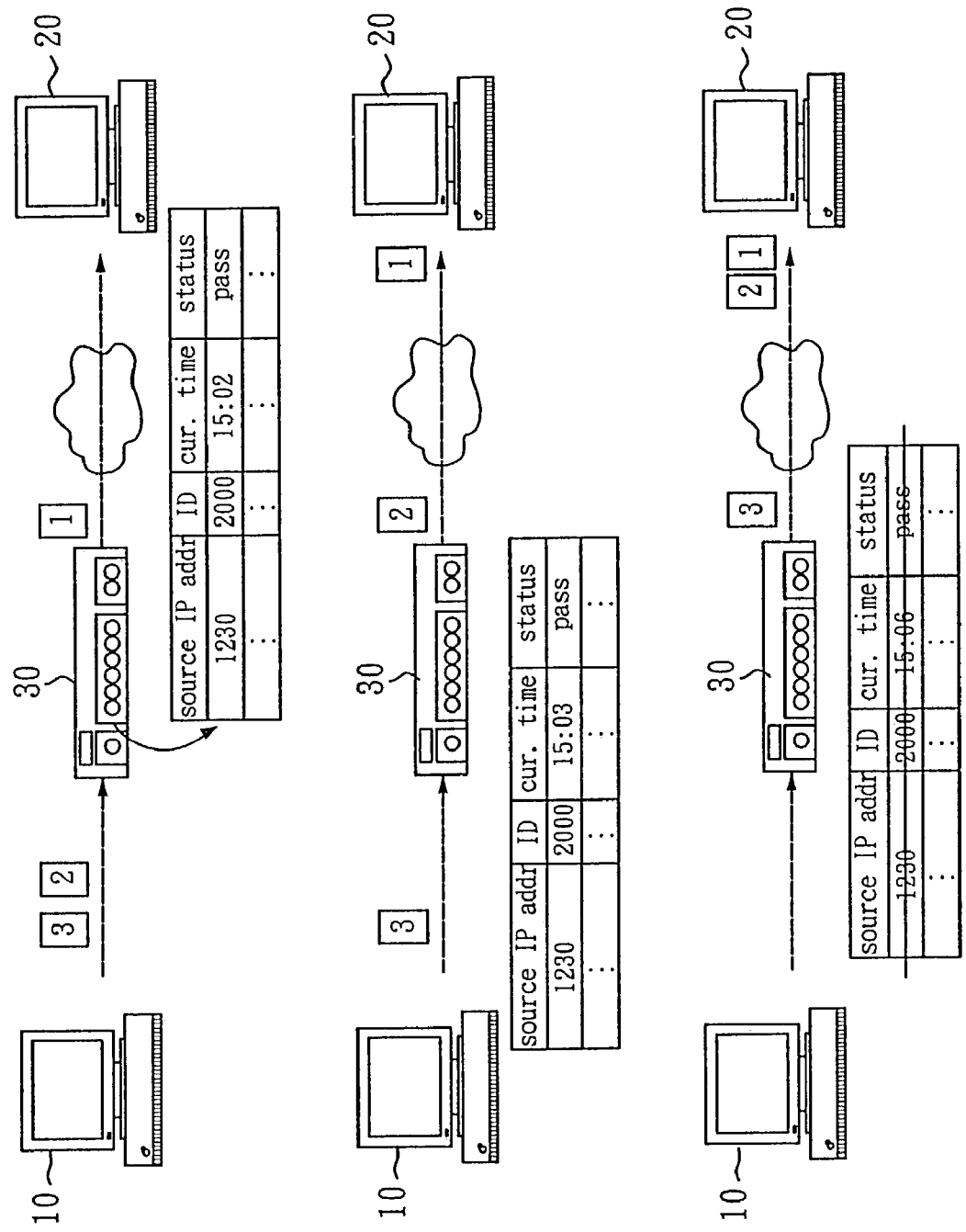
Figure 7:
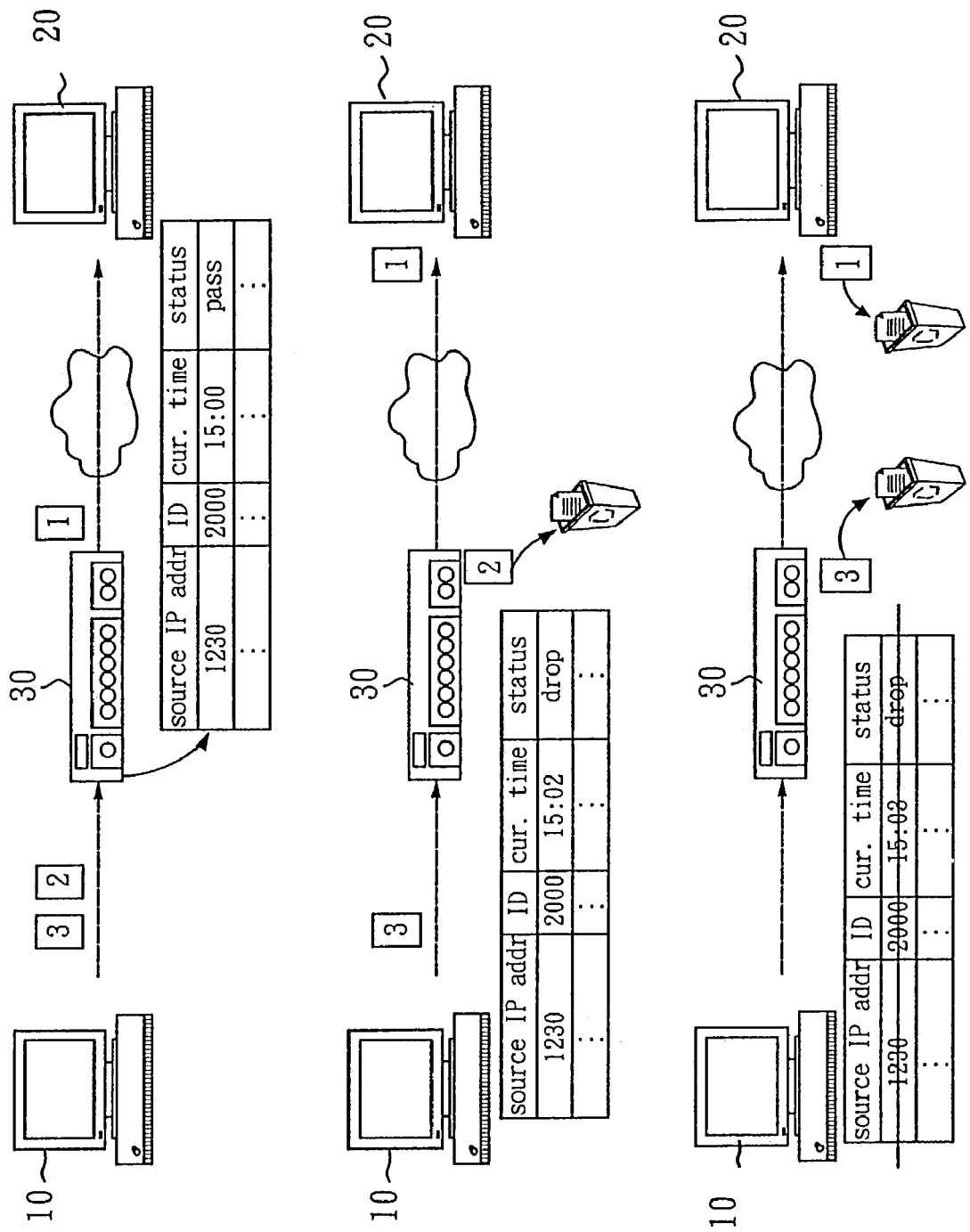

FIGS. 5-7 illustrate the transmission of fragmented IP packets originated from the same packet from the first machine 10 to the second machine 20 via the router 30 under three different conditions. With reference to FIG. 5, the first fragmented IP packet of a set is dropped according to the QoS rules. The subsequent second and third fragmented IP packets of the same set are also dropped. Hence, all of the first, second, and third fragmented IP packets are dropped in the router 30 without being sent to the second machine 20. In FIG. 6, when transmitting the second and third fragmented IP packets, the used bandwidth of the flow exceeds the guaranteed bandwidth but not exceeds the limited bandwidth. Thus, the second and third IP packets can pass the router 30 for being sent to the second machine 20. In FIG. 7, when transmitting the second packet, because the used bandwidth of the flow exceeds the limited bandwidth, the second packet is dropped. The status field of the table in the router 30 changes from 'pass' to 'drop' and the subsequent third fragmented IP packet will be dropped without being sent to the second machine 20.

The above embodiment is described with respect to a sequential transmission of fragmented IP packets, while it is appreciated by those skilled in the art that the present invention may be applied to a random one without departing from the scope and spirit of the present invention. In detail, any fragmented IP packet of a set other than the first one can be received earlier and buffered at the router 30. In a case that the first fragmented IP packet of the set is received, all buffered fragmented IP packets of the set are then reordered prior to sequentially sending to the second machine 20. In another case that the first fragmented IP packet of the set is not received after a predetermined period of time (timeout) has passed, all buffered fragmented IP packets of the set are dropped at the router 30.

In view of the forgoing, it is known that the present invention uses a table in a router to record the status of previous packets of a set of fragmented IP packets such that the router can utilize the association of the set of fragmented IP packets. Hence, if a fragmented IP packet from a set of fragmented IP packets is dropped according to the QoS rules, the subsequent fragmented IP packets of the same set are also dropped to save channel bandwidth and the resources of the following routers and the destination machine. When the first fragmented IP packet of a set is passed, the subsequent fragmented IP packets of the same set are also allowed to pass if the used bandwidth of the flow is smaller than the limited bandwidth, so as to increase a probability of successfully reassembling the original packet at the destination machine, thereby achieving an effective QoS.

Although the present invention has been explained in relation to its preferred embodiment, it is to be understood that many other possible modifications and variations can be made without departing from the spirit and scope of the invention as hereinafter claimed.

What is claimed is:

1. A quality of service (QoS) method for effectively processing a plurality of fragmented Internet Protocol (IP) packets transmitted over flows of a network, the method comprising the steps of:
   (A) when receiving a first fragmented IP packet of a set of fragmented IP packets from a flow, a router determining whether to allow the first fragmented IP packet of the set to pass or to drop by according to predefined QoS rules, wherein when determining to allow the packet to pass, a 'pass' status is recorded in a record corresponding to the set of fragmented IP packets, and when determining to drop the packet, a 'drop' status is recorded in a record corresponding to the set of fragmented IP packets; and
   (B) when receiving other fragmented IP packet of the set of fragmented IP packets, the router determining whether to allow the fragmented IP packet to pass or to drop by according to the record of the set of fragmented IP packets, wherein if the record of the set of fragmented IP packets is 'drop' status, the packet is dropped, and if the record of the set of fragmented IP packets is 'pass' status, the packet is allowed to pass when the used bandwidth of the flow does not exceeds a predetermined bandwidth, otherwise the packet is dropped and the record of the set of fragmented IP packets is modified to the 'drop' status.

2. The method as claimed in claim 1, wherein in the step (B) the predetermined bandwidth is a limited bandwidth of the flow.

3. The method as claimed in claim 2, wherein in the step (A), the predefined QoS rules are: the fragmented IP packet is dropped if used bandwidth of the flow exceeds the limited bandwidth; the fragmented IP packet is passed if the used bandwidth of the flow does not exceed a guaranteed bandwidth; and whether to allow the fragmented IP packet to pass or to drop the fragmented IP packet is decided by a Random Early Detection (RED) technique if the used bandwidth of the flow is between the limited bandwidth and the guaranteed bandwidth.

4. The method as claimed in claim 1, wherein in the step (A), when determining to allow the packet to pass, the record corresponding to the set of fragmented IP packets is further recorded with identification, source IP address, and current time.

5. The method as claimed in claim 1, wherein in the step (A), when determining to drop the packet, the record corresponding to the set of fragmented IP packets is further recorded with identification, source IP address, and current time.

6. The method as claimed in claim 1, further comprising a step (C) for deleting the record of the set of fragmented IP packets when the router detects that a last fragmented IP packet of the set of fragmented IP packets is passed or dropped, or no fragmented IP packet of the set is received after a predetermined period of time has passed.

7. The method as claimed in claim 1, wherein, when first receiving a fragmented IP packet of a set other than the first one, the router buffers the fragmented IP packet of the set, so that once the first fragmented IP packet of the set is received, all of the received fragmented IP packets of the set are reordered, or all of the received fragmented IP packets of the set are dropped if the first fragmented IP packet is not received after a predetermined period of time has passed.

8. A quality of service (QoS) system for effectively processing a plurality of fragmented Internet Protocol (IP) packets, comprising:
   first and second machines resided in a network, the first machine being capable of forming a set of multiple fragmented IP packets by performing an IP fragmentation on a packet to be transmitted to the second machine; and
   at least one router for routing the packet of the set of fragmented IP packets transmitted from a flow to the second machine;
   wherein when receiving a first fragmented IP packet of a set of fragmented IP packets, the router determines whether to allow the first fragmented IP packet to pass or to drop by according to predefined QoS rules; when determining to allow the packet to pass, a 'pass' status is recorded in a record corresponding to the set of fragmented IP packets; when determining to drop the packet, a 'drop' status is recorded in a record corresponding to the set of fragmented IP packets; and wherein when receiving other fragmented IP packet of the set of fragmented IP packets, the router determines whether to allow the fragmented IP packet to pass or to drop by according to the record of the set of fragmented IP packets; if the record of the set of fragmented IP packets is 'drop' status, the packet is dropped, and if the record of the set of fragmented IP packets is 'pass' status, the packet is allowed to pass when the used bandwidth of the flow does not exceeds a predetermined bandwidth; otherwise the packet is dropped and the record of the set of fragmented IP packets is modified to the 'drop' status.

9. The system as claimed in claim 8, wherein the predetermined bandwidth is a limited bandwidth of the flow.

10. The system as claimed in claim 9, wherein, the predefined QoS rules are: the fragmented IP packet is dropped if used bandwidth of the flow exceeds the limited bandwidth; the fragmented IP packet is passed if the used bandwidth of the flow does not exceed a guaranteed bandwidth; and whether to allow the fragmented IP packet to pass or drop the fragmented IP packet is decided by a Random Early Detection (RED) technique if the used bandwidth of the flow is between the limited bandwidth and the guaranteed bandwidth.

11. The system as claimed in claim 8, wherein, when the router determines to allow the packet to pass, the record corresponding to the set of fragmented IP packets is further recorded with identification, source IP address, and current time.

12. The system as claimed in claim 8, wherein, when the router determines to drop the packet, the record corresponding to the set of fragmented IP packets is further recorded with identification, source IP address, and current time.

13. The system as claimed in claim 8, wherein the router deletes the record of the set of fragmented IP packets when detecting that a last fragmented IP packet of the set of fragmented IP packets is passed or dropped, or no fragmented IP packet of the set is received after a predetermined period of time has passed.

14. The system as claimed in claim 8, wherein, when first receiving a fragmented IP packet of a set other than the first one, the router buffers the fragmented IP packet, so that once the first fragmented IP packet of the set is received, all of the received fragmented IP packets of the set are reordered, or all of the received fragmented IP packets of the set are dropped if the first fragmented IP packet is not received after a predetermined period of time has passed.

* * * * *